Aug. 6, 1940.  E. D. EBY  2,210,804
CONNECTOR FOR CABLES
Filed April 7, 1938
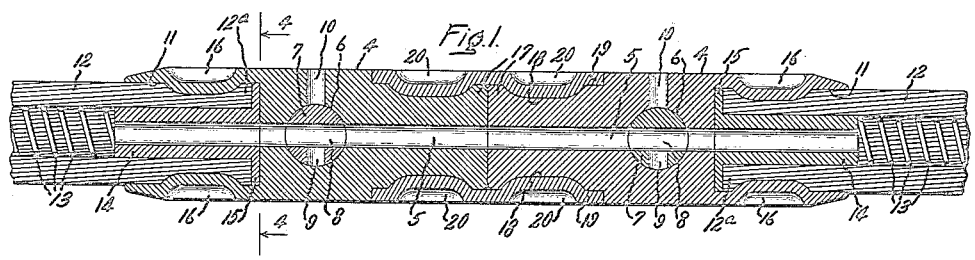
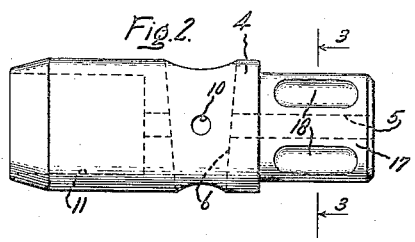
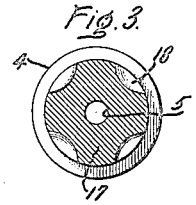
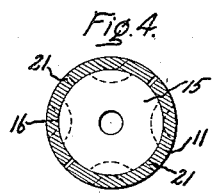
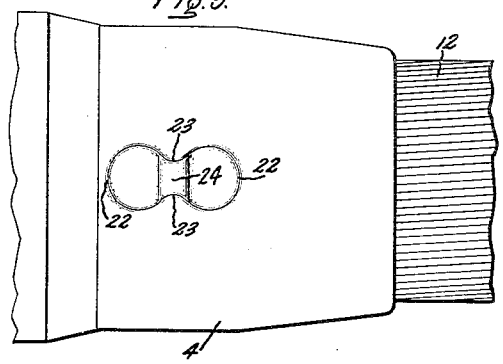
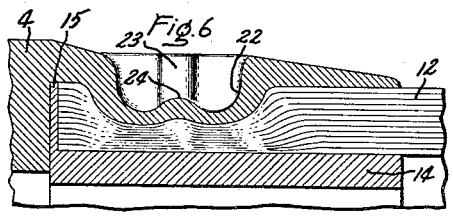
Inventor:
Eugene D. Eby,
by Harry E. Dunham
His Attorney.

Patented Aug. 6, 1940

2,210,804

UNITED STATES PATENT OFFICE 2,210,804

CONNECTOR FOR CABLES

Eugene D. Eby, Pittsfield, Mass., assignor to General Electric Company, a corporation of New York Application April 7, 1938, Serial No. 200,695

4 Claims. (Cl. 174—21)

In connecting adjacent lengths of insulated electric cables, it has long been the established practice to solder the adjacent ends of the conductors into sockets formed in the connector ends. It is desirable, however, to avoid soldering operations for various reasons, among which may be mentioned that the heat incident to the soldering operation, unless done with great care, causes burning of the insulation on the conductors as well as the oil or other impregnating compound contained in the insulation. In this connection, it is to be noted that the connector itself has to be heated to a fairly high temperature before the soldering operation can begin since otherwise the solder will not properly act. If the splicer does an imperfect job, there is little or no chance of detecting the burning of the insulation or the oil since after the parts are assembled, there may be no visible evidence of the damage. A soldering operation also requires that exposed soldered surfaces be carefully filed and polished and the whole carefully cleaned to prevent metal particles from being embedded either in the factory applied insulation or in the tape windings used to complete the work after the conductors are united. Also, these soldering operations require a considerable amount of time on the part of the splicing crew. As these operations in most instances have to be done in unclean manholes, the use of blow torches and heated soldering pots therein constitutes a fire hazard.

Although the outward appearance of a soldered joint may be quite uniform and satisfactory it may happen, due to faulty workmanship, that the connector and the strands of the conductors are not properly united with the result that the electrical conductivity and the mechanical strength of the joint are below normal.

My invention has for an object the provision of an improved cable connector in the application of which the objections above mentioned are entirely eliminated and specifically the use of heat. According to my improved construction, neither the connector nor the cable is subjected to heat, the parts being united while in a cold state by means of an hydraulic press.

A further object of my invention is an improved method of separating mechanically united connectors and stranded conductors preparatory to substituting a new connector without appreciably injuring the strands of the conductors.

In Patent 2,182,663 issued December 5, 1939 is disclosed an hydraulic press, the invention of myself and Thomas C. Aitchison, which is suitable for use in applying my improved connector.

For a consideration of what I believe to be novel and my invention, attention is directed to the accompanying description and the claims appended thereto.

In the accompanying drawing, which is illustrative of my invention, Fig. 1 is a longitudinal section of a connector with the cable ends secured therein; Fig. 2 is a view in elevation of one half of the connector; Fig. 3 is a section taken on line 3—3 of Fig. 2; Fig. 4 is a sectional view showing how the connector is cut preparatory to removing it, and Figs. 5 and 6 are detail views illustrating a modified form of indentation.

I have elected to illustrate my invention in connection with stranded hollow core fluid filled cables since such an embodiment presents greater problems than connectors for solid type cables. While my invention will be disclosed in connection with cable joints for fluid filled and solid type cable, it is to be understood that it is not limited thereto since it can be utilized with advantage in other applications of which the union of a stranded conductor either of the fluid filled or solid type to a terminal stud or other conductor is an example.

Because in fluid filled cables, it is desirable before applying a connector to incline the ends of the cables upwardly to facilitate discharge of foreign matter such as air and moisture and also to form traps against the admission of air into the bodies of the cables, the connector is made in two principal and generally identical parts, one for each cable length. Each half connector comprises a body portion 4 containing a central bore or passage 5 for fluid, such as degasified oil, for example. It also has a conical seat 6 for a snugly fitted plug valve 7. The valve has a through passage 8 and a lateral passage 9 communicating therewith. In the body is a port 10 through which fluid may be admitted or withdrawn from the interior of the cable. As shown, the port 10 is shut off but may be opened by giving the valve a quarter turn in either direction. The body has a socket 11 on one side into which an end of a stranded cable 12 is inserted and later secured in place. The strands of the conductor are assembled around an internal support such as a coiled spring 13 to define a core. In order to support the strands and prevent collapsing thereof when pressure is applied externally to the wall of the socket, a short strong tube 14 having a positioning head or flange 15 is inserted in the hollow core of the conductor.

As shown, the tube 14 is made as a separate part but it may be formed as a part of the connector whenever it is considered desirable to do so. The half connector and the conductor are united mechanically and electrically by forcing metal of the wall of the socket inwardly in angularly spaced regions into the strands to form indentations 16. These indentations or deformations are desirably relatively long and narrow and have sides which converge toward the bottom wall thereof to such a degree that in the process of removal of the connector the surfaces of the indentations will clear the strands, thereby leaving them essentially in the same condition and position which they occupied within the connector socket. I have found that four such indentations are sufficient to firmly unite the parts although in some cases a greater or lesser number may be used. The punches for making the indentations may have any desired shape but it has been found that wedge shaped punches are desirable in order to give a relatively greater length to the compacted or deformed section of the strands and thus increase the contact area between the strands and the connector. This axially extending form of indentation together with the angular spacing is desirable as it is thus made possible to remove a connector without injury to the cable strands. It also permits of additional anchoring of the strands between an end of the indentation and the body of the connector as indicated at 12a. Should the indentations or deformations be made in planes perpendicular to the axis instead of in axial planes, it would be very difficult to remove the half connector without injuring or distorting the strands which is an important factor in cable installations where there is little or no opportunity to cut off the end of a cable and start anew. The half connector on the end opposite the socket has a thick wall tubular extension 17 terminating in a flat face perpendicular to the axis. In the extension are preformed recesses 18 of which four are shown but a different number may be provided. The recesses are relatively wide and shallow so as not to unduly stress the metal forming the indentations or form cracks therein. As shown in cross-section the recesses are in the form of arcs of circles. The shape of the recesses is determined by the shape of the punches of the press and the dimensions of the extension and enclosing sleeve. These preformed recesses are provided because the metal of the extension is so thick as to be practically unyielding under the pressures which may as a practical matter be employed. Also, they prevent distortion of the extension when subjected to external compression pressure.

In order to unite the two half connectors electrically and mechanically a third element or member in the form of a sleeve 19 is provided. Initially the member is in the form of a true cylinder adapted to make a reasonably easy fit over the cylindrical surfaces of the adjacent extensions. The metal of the sleeve is forced into the recesses 18 by a press having tapered punches thereby forming indentations or depressions 20, the walls of which converge toward the bottom thereof. This requires accurate setting of the punches of the press both angularly and axially, as more fully explained in the patent of Aitchison and myself referred to above.

It will be noted that the extension 17 of each half connector is reduced in diameter, thereby forming an annular shoulder; also that the third element or sleeve 19 is located between the shoulders and has the same diameter as the main or central part of the body. The presence of external projections, whether on one part or the other, would cause concentration of electrical stresses at said projections and this is particularly true where the parts are subjected to such high potentials that corona effects tend to exist. The above stated objection is avoided in my improved construction by making the connector parts and the sleeve of the same diameter throughout their respective lengths and with smooth exterior surfaces. The fact that the parts are of the same diameter and have smooth exteriors has the further advantage of greatly facilitating the covering thereof with insulating tapes as is the customary and necessary practice with cable connectors. The fact that there are indentations is of no importance in this particular because the circular contour of the sleeve is maintained, the surfaces of the indents are smooth and hence devoid of sharp projections or corners and the tape will lie smoothly over the surfaces.

When for any reason it becomes desirable to remove a connector and substitute a new one, cuts are made through the half connectors perpendicular to axis thereof substantially in the planes of the flanges 15. This results in leaving on the conductors the parts of the sockets which are united therewith. These remaining parts partake of the nature of ferrules. To remove them, the metal of the ferrule is cut as by sawing in axial planes, the cuts 21 desirably being located midway between the indentations, as shown in Fig. 4, and extending to the conductor. Where there are four such indentations, two or four such cuts may be made, after which the ferrule may be removed without difficulty to expose the strands of the cable. This will leave the cable strands with as many indentations as there were indentations in the original socket. In applying a new half connector to the cable, the press should be so located that the indentations made thereby in the socket register both angularly and axially with the indentations in the strands. By this arrangement, it becomes unnecessary to cut the conductors, thereby shortening them. It also prevents further distortion of the strands which might result in imperfect union of the parts.

It is to be noted that the indentations in the socket and in the sleeve are spaced a substantial distance from the valve seat so as not in any way to deform the center part of the half connector. Should any such deformation take place, it would result in distortion of the valve seat which would require an extra operation in restoring the seat to its original form and may even require the use of an oversized plug valve which would be highly objectionable.

As previously indicated, my invention is described principally in connection with a connector for hollow core fluid filled cable because such a connector presents more and greater problems than where the connectors are used for solid type cable and other conductors where no valves are provided and where the extension 17 is or may be made solid. The connectors has been described as comprising two identical main parts or members but the invention is not limited thereto since dissimilar parts may be united. The main considerations are that the socket shall be of a size and shape to receive one of the cables or conductors and to hold it by reason of the indentations therein, that at least one part of the connector shall have preformed grooves or recesses to receive the indented metal from another part and that the symmetry of the conductor parts and of the conductors be preserved particularly on account of dielectric stress considerations.

In Figs. 5 and 6 is shown a modified form or shape for the indentation which has the advantage of affording better anchorage between a stranded conductor and the connector. The indentation has two enlarged ends 22, the walls of which are of circular or substantially circular form and connected by inwardly curved opposed walls 23. The distance between the walls 23 is substantially less than that between the walls of the enlarged ends measured in a plane perpendicular to the axis of the conductor. This form of indent may be made in any suitable manner as, for example, by a pair of punches arranged side by side in the press. The walls 23 cause an additional locking of the conductor strands at a midpoint in the indentation, because the strands follow the shape of the indent. A further locking of the conductor strands may be obtained by upwardly curving the bottom wall 24 of the indent as shown in Fig. 6. This figure clearly shows how the conductor strands follow the shape of the indent. The curvature of the bottom wall may be obtained by properly shaping the ends of the punches used in making the indent. If desired, a greater number of punches may be used in which case the shape of the indent would be slightly modified. Obviously, any strain on the conductor that tends to pull it out of the connector is resisted by the indent as a whole, by the inwardly opposed walls 23 and by the upwardly curved bottom wall 24.

In addition to other advantages and specifically avoiding the fire hazard incident to soldering operations, including burning of insulation and oil, the use of my improved connector results in a great saving in time in effecting a joint, the saving being of the order of two-thirds of that required to make a soldered joint.

What I claim as new and desire to secure by Letters Patent of the United States is:

1. An electrical connector for conductors comprising two principal parts, each having a central body portion, a socket for a conductor integral with the body and located at one end thereof, a stranded conductor located in the socket, an indentation projecting inwardly from the outer wall of the socket into and between the strands, the indentation having enlarged ends connected by narrowly spaced walls whereby in addition to the locking of the strands produced by reason of the strands extending longitudinally beyond the indentation there is provided locking of the strands at the midpoint of the indentation, an extension integral with the body located at the end opposite the socket, preformed grooves in the extension, a sleeve surrounding both of the extensions, and indentations in the sleeve that are seated in the grooves and unite the parts.

2. An electrical connector having two body parts, each part having a socket at one end thereof and a stranded conductor located therein, a longitudinally extending deformation comprising an indentation in the wall of each socket projecting inwardly into and deforming the strands of said conductor, said deformation having a long axial dimension in comparison to its circumferential dimension, an extension of lesser diameter at the other end of each body part having a preformed recess in its peripheral surface, an external sleeve fitting over both the extensions and having an inwardly projecting deformation comprising an indentation of complementary size and location with respect to said recess and extending thereinto for uniting said body parts, said sleeve being of substantially the same outer diameter as said body parts thereby providing a substantially symmetrical connector whereby concentration of dielectric stresses are minimized.

3. A two-part electrical connector, each part comprising a body having a passage therethrough, a valve and a valve seat located in the central portion of the body and adjacent to a socket formed at one end of the body, a stranded, fluid filled conductor located in each socket, longitudinally extending deformations in the wall of each socket comprising indentations projecting inwardly into and deforming the strands of said conductor, said deformations being relatively small with a long axial dimension in comparison to the circumferential dimension and being symmetrically angularly spaced thereby providing a substantially symmetrical connector whereby concentration of dielectric stresses are minimized, said deformations being located wholly at one side of the valve and its seat, an extension formed at the other end of the body having longitudinally extending angularly spaced preformed recesses in its peripheral surface, and a separate sleeve fitting over both the extensions and having inwardly projecting deformations comprising indentations of complementary size and location with respect to said recesses and extending thereinto for uniting said two body parts to form a joint between said conductors.

4. An electrical connector for uniting the ends of adjacent lengths of stranded, fluid filled cable, comprising two metallic body members, each having a socket at its outer end for receiving one of said stranded cable ends and a shouldered extension of lesser diameter at its inner end with preformed axial grooves having closed ends formed in the shouldered extensions, longitudinally extending deformations comprising indentations in the wall of each socket projecting inwardly into and deforming the strands of said cable end, said deformations being relatively small with a long axial dimension in comparison to the circumferential dimension and being symmetrically angularly spaced, a third metallic tubular member having a smooth exterior surface fitted over and surrounding the extensions and located between the shoulders of the two body members, the outside diameter of the third member being substantially the same as that of the body members and presenting a circular contour, and deformations comprising indents in the third member occupying the grooves in the extensions for electrically and mechanically uniting the two body members, the ends of the indents engaging the ends of the grooves for resisting end pull of the conductors tending to separate the body members, whereby an electrical connector is provided having a substantially symmetrical surface for minimizing concentration of dielectric stresses.

EUGENE D. EBY.